United States Patent

[11] 3,591,780

[72] Inventor Peter E. Rosenfeld
Berkeley Heights, N.J.

[21] Appl. No. 718,805
[22] Filed Apr. 4, 1968
[45] Patented July 6, 1971
[73] Assignee Bell Telephone Laboratories, Incorporated
Murray Hill, Berkeley Heights, N.J.

[54] STRAIGHT LINE GENERATOR WHICH SPECIFIES A POSITION INCREMENT IN A MINOR COMPONENT DIRECTION ONLY WHEN ACCOMPANIED BY AN INCREMENT IN THE MAJOR COMPONENT DIRECTION
7 Claims, 8 Drawing Figs.

[52] U.S. Cl. .......... 235/151.1, 235/151.11, 318/573, 235/152
[51] Int. Cl. .......... G06g 7/48
[50] Field of Search .......... 235/151.1, 151.11, 151, 150.3, 198; 315/18, 22, 24.26; 318/20.100, 20.102, 20.105, 20.108, 20.120, 20.130, 20.132, 20.135, 20.155, 20.605

[56] References Cited

UNITED STATES PATENTS

| | | | |
|---|---|---|---|
| 3,090,041 | 5/1963 | Dell | 315/18 X |
| 3,320,595 | 5/1967 | Yanisheusky | 235/198 X |
| 3,372,268 | 3/1968 | Hoernes | 235/151.11 |
| 3,413,453 | 11/1968 | Thorpe | 340/324.1 X |
| 3,423,528 | 1/1969 | Bradshaw et al. | 235/198 X |
| 3,430,207 | 2/1969 | Davis | 340/324.1 X |
| 3,459,926 | 8/1969 | Heilweil et al. | 340/324.1 X |

*Primary Examiner*—Malcolm A. Morrison
*Assistant Examiner*—Joseph F. Ruggiero
*Attorneys*—R. J. Guenther and William L. Keefauver

ABSTRACT: A technique for vector generation in a point-plotting system is disclosed which provides an improved approximation to the desired linear trajectory by specifying a position increment in a minor component direction only when accompanied by an increment in a major component direction.

INVENTOR
P. E. ROSENFELD
BY R. O. Nimtz
ATTORNEY

STRAIGHT LINE GENERATOR WHICH SPECIFIES A POSITION INCREMENT IN A MINOR COMPONENT DIRECTION ONLY WHEN ACCOMPANIED BY AN INCREMENT IN THE MAJOR COMPONENT DIRECTION

This invention relates to positioning methods and apparatus, including methods and apparatus for positioning a drawing or cutting device. More particularly this invention relates to positioning methods and apparatus for use in connection with a data processing system. Still more particularly this invention relates to a graphics system for improving the linearity of nominally straight lines drawn in response to data signals supplied by a digital computer or otherwise.

There are many well-known machines and techniques for aiding draftsman, circuit designers and machine tool operators in specifying or representing a straight line path. Various mechanical plotting instruments are well known. Similarly, guides and jigs have been used to control the path of machine tools intended to machine a straight line or level surface.

Recent years have witnessed increased use of digital computers to extend the capabilities of designers and operators in many fields. Such use has brought forth further developments in the form of mechanical and electromechanical devices to facilitate a representation or prescription of computed results. The well-known incremental X–Y plotter operates in response to a sequence of digital signals, typically generated by a computer, to draw circuit diagrams or other graphical representations of equivalent or greater complexity. Similarly, there have been developed a variety of numerically-controlled milling machines and other machine tools which depend on the computational facilities of a digital computer.

Many of the above-mentioned devices and machines operate by specifying the position of a pen or cutting tool at a sequence of distinct points. Thus, a straight line is generated by prescribing that the pen or cutting tool follow a sequence of approximately linearly-related points. A further very useful example of such so-called point-plotting techniques comprises a cathode-ray tube (CRT) supplied with a sequence of electrical signals which determine the position of an electron beam. The following discussion will proceed in the context of such a point-plotting CRT, but it should be understood that the techniques are equally applicable in a pen-plotter context, or in a numerically-controlled machine tool or similar environment.

It is desirable in drawing an image of a straight line on the face of a CRT to specify only the end points of the line or, alternately, one end point and the spacing from that end point to the other. Circuits have been developed which will accept this information and generate therefrom a sequence of signals to be applied to the deflection system of a CRT, thereby to cause the electron beam to proceed from the specified initial point to the specified terminal point along a sequence of points approximating a straight line. A particularly useful example of such a circuit is the well-known binary rate multiplier (BRM) circuit described, for example, in U.S. Pat Nos. 2,913,179, issued to B. M. Gordon on Nov. 17, 1959 and 2,910,237, issued to M.A. Meyer et al. on Oct. 27, 1959. A further useful reference is *Computer Control Systems Technology*, C. T. Leondes, ed., McGraw Hill, New York, 1961, pp. 559—571, where the use of a BRM is described in a numerically-controlled machine tool context.

Binary rate multipliers have been found in many point-plotting systems to suffer from the shortcoming that they specify a sequence of points which produce an image having excessive irregularity with respect to the desired linear image. In particular, a binary rate multiplier often is found to specify a sequence of points representing an image greatly resembling a staircase, rather than a straight line. This is often referred to as a staircase effect.

SUMMARY OF THE INVENTION

The present invention provides means for reducing this staircase effect, thereby producing an image having greater linearity and improved graphical appearance. This improvement is achieved with a minimum of additional circuitry and also provides for increased speed in generating the desired line segment. Briefly stated, the present invention provides methods and apparatus which specify a position increment in the direction of a minor component only when accompanied by an increment in the major component. Alternately, beam intensification is inhibited unless these restrictions are followed.

BRIEF DESCRIPTION OF THE DRAWINGS

These and other features of the present invention will be more clearly understood in connection with the detailed description given below and in the attached drawings wherein.

DETAILED DESCRIPTION

Figure 1:
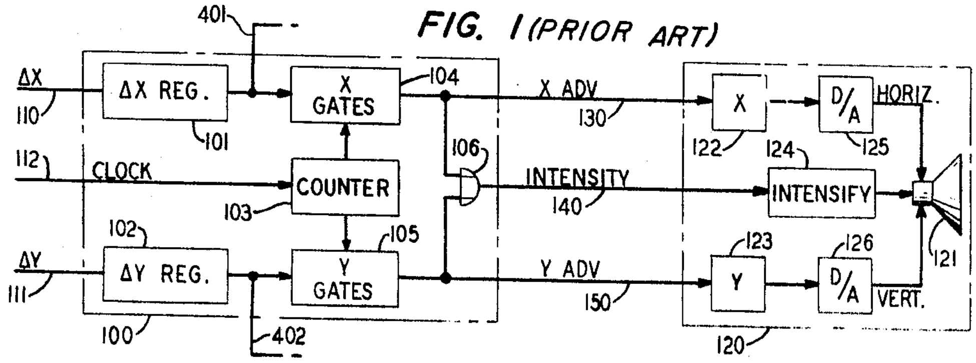
FIG. 1 (PRIOR ART)
FIG. 1 shows a prior art BRM configuration in combination with apparatus suitable for generating a linear image on a CRT.

Prior art techniques for generating approximations to straight line images on a CRT typically use information corresponding to the desired respective coordinate component increments to generate two sequences for controlling the deflection of an electron beam in the respective coordinate directions. These sequences are typically used to increment the contents of absolute position registers corresponding to the X- and Y- coordinate directions on the CRT. FIG. 1 illustrates in broad outline the components of such a prior art positioning system.

FIG. 1 shows a block identified as 100 having three inputs and three outputs; this will be taken to be a typical two-dimensional BRM configuration. One of the inputs, that on lead 110, specifies information corresponding to the magnitude of the X increment of the desired straight line image. This information is typically entered in the form of binary signals into a register shown as 101. Similarly, lead 111 provides information specifying the magnitude of the Y component of the desired straight line image. Again this information is conveniently stored in binary form in register 102.

The final input to BRM 100, shown on lead 112, is a clock signal, which signal is used to advance a standard binary counter 103 through its normal sequence of states. Block 104 comprises a plurality of gating circuits which combine outputs from binary counter 103 and those from register 101 to provide on lead 130 a sequence of pulses at a rate proportional to the magnitude of the input on lead 110 which has been stored in register 101. The combination of signals supplied by register 101 and counter 103 and applied to gates 104 serves to divide by selection the clock signal supplied on lead 112. This division (or, viewed alternately, multiplication by a factor less than unity) is described in great detail in the Leondes reference, supra.

Similarly, there is generated on lead 150 a sequence of pulses at a rate corresponding to the relative magnitude of the Y increment, specified by signals on lead 111 which have been stored in register 102.

The sequences of signals appearing on leads 130 and 150 are such that, when applied to a CRT incremental X–Y deflection system, they cause the controlled electron beam to pass from an original or starting point to a terminal point along a sequence of points on the face of the CRT which points approximate the desired straight line. The deflection system is represented in FIG. 1 by apparatus blocks including a counting X register 122 which stores the absolute position of the X coordinate of a point on the face of CRT 121. Digital-to-analog converter 125 shown in FIG. 1 is used for the purpose of converting the position information in register 122 into suitable form for deflecting the electron beam in CRT 121. A corresponding Y register 123 and digital-to-analog converter 126 are also shown for performing corresponding functions for the Y or vertical direction. Finally, there is shown in FIG. 1 a gate 106 which provides on its output a gating signal whenever an advance is specified in either of the X or Y direction by signals on either of leads 130 or 150, respectively. This gated signal appearing on lead 140 is used to control an intensifying circuit 124. This latter circuit may, for example, gate the electron gun in CRT 121.

The rate at which any straight line is drawn is determined in part by the clock signal rate. In addition, there are fundamental limitations inherent in the deflection and intensification circuitry which require that there be a spacing between successive advance signals, i.e., the clock signals cannot be set at an arbitrarily high rate. This period of time is required, for example, to allow the beam to physically travel the distance from one point to the next. In addition, there are developed various transient signals in the deflection circuitry, whether it be magnetic or electrostatic, and in the intensification circuitry, which transients must be allowed to sufficiently decay before a subsequent advance is specified. This spacing is needed if there is to be no interaction between successive advance signals. Additionally, and perhaps of greater importance, the deflection signals must have sufficiently settled to allow the electron beam to specify only a single point when it is turned on. If this is not the case a blurred point image will result.

It is most often true that nonintensified points can be specified in more rapid succession than intensified points because of the transients developed in the high power intensification circuitry 124 and the analog deflection circuitry associated with CRT 121. A greater tolerance to deflection transients is also present because no allowance for settling need be made; i.e., it is not necessary to wait for settling to occur before proceeding to the next point. Thus, it often takes a shorter time to complete the various deflection activities alone than it does to perform the complete positioning functions when an electron beam is physically present. The time required to "position" a nonintensified point may, in some cases, be shortened by inhibiting the analog deflection circuitry completely.

Figure 2A:
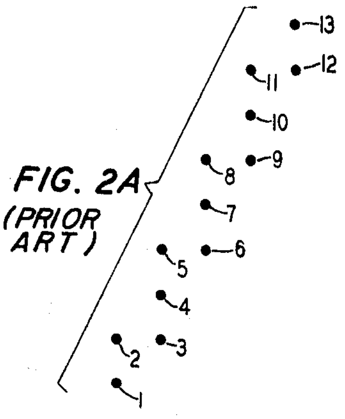
FIG. 2A (PRIOR ART)
FIG. 2A shows a typical sequence of points approximating a straight line which points are specified by a prior art BRM.

FIG. 2A shows a sequence of points 1 through 13 representing a typical output on CRT 121 corresponding to input increments given by $\Delta X=4, \Delta Y=8$ and specified on leads 110 and 111 respectively. It should be noted that there is a pronounced staircase effect in the sequence of points shown in FIG. 2A.

Figure 3:
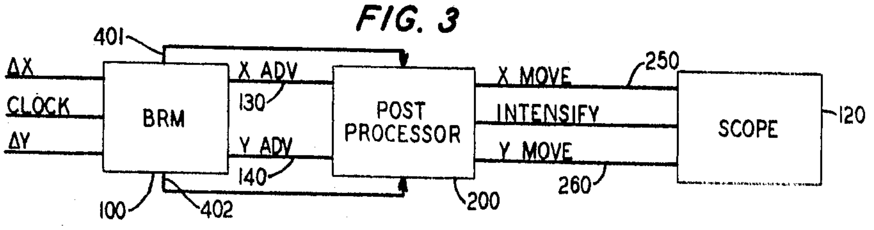
FIG. 3 illustrates the general techniques in accordance with one embodiment of the present invention for interposing a postprocessor between a prior art BRM and typical image generating apparatus.

FIG. 3 shows a variation of the apparatus of FIG. 1 which further includes a postprocessor 200 interposed between BRM 100 and the image generation circuitry 120. The combination including postprocessor 200 represents, in broad outline, one hardware embodiment of the present invention.

The present invention is readily understood in certain of its aspects through the statement of an algorithm or method of positioning a controlled element. The controlled element may, of course, be a machine tool, a pen, a CRT beam or similar elements. An algorithm for two-dimensional linear position control in accordance with one embodiment of the present invention contemplates the identification of the larger of the two components $\Delta X$ and $\Delta Y$ as a major component; the remaining component is referred to as a minor component. One version of this algorithm provides that: When generating signals for incrementing the X and Y coordinates of a controlled element no increment shall be specified for the component corresponding to the minor component of the vector unless there is identified with this minor component increment a corresponding increment in the major component direction.

Figure 2B:
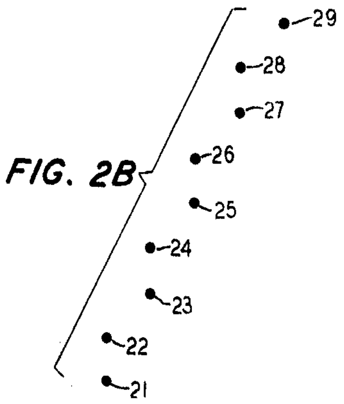
FIG. 2B shows a sequence of points providing an improved approximation to a desired straight line and generated in accordance with one embodiment of the present invention.

FIG. 2B illustrates a sequence of points 21—29 generated in accordance with one embodiment of the present invention. It is readily apparent, when comparison is made with the point sequence of FIG. 2A, that irregularities in the nature of a staircase effect have been markedly reduced. It should also be apparent that because of the reduction in the number of intensified points specified that a given line segment can be generated in approximate form in a shorter time when using the present invention.

Figure 4A:
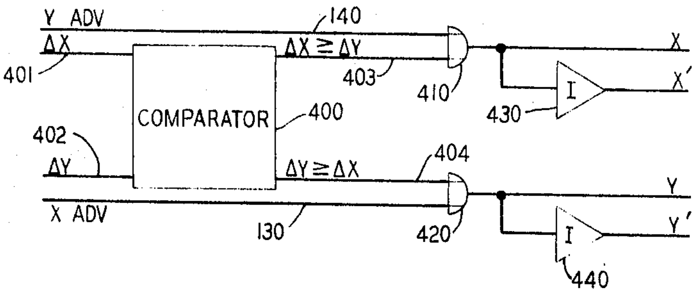
FIGS. 4A, B and C show apparatus for performing the postprocessor function shown in FIG. 3 in accordance with one embodiment of the present invention.

FIGS. 4A, B and C show one embodiment of a postprocessor to be used as shown in FIG. 3. The circuitry shown in FIG. 4A is intended for use with that of FIG. 4B for generating advance signals corresponding to X increments. Similarly, the circuitry of FIG. 4A is intended for use with that of FIG. 4C for providing Y increment signals. The outputs of FIGS. 4B and 4C on leads 250 and 260 therefore correspond in part to those previously supplied by the prior art shown in FIG. 1 on leads 130 and 150.

Figure 4B:
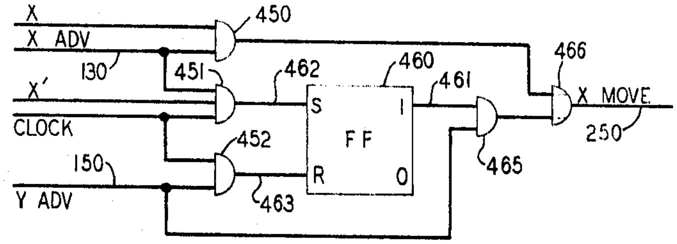
Figure 4C:
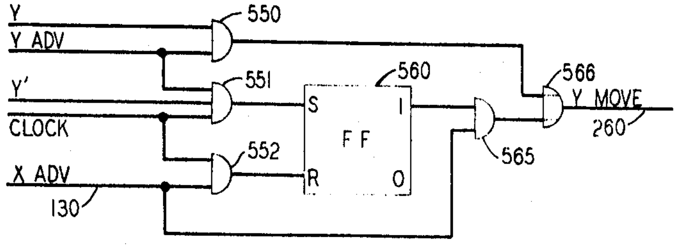

The functions performed by the circuits of FIGS. 4A—C include that of temporarily storing certain increment signals corresponding to the minor component of the desired straight line. Thus, if, because of the particular $\Delta X$ and $\Delta Y$ specified, and because of the inherent functioning of BRM 100, these increment signals should be developed on the lead corresponding to minor component advance signals (say, lead 130 when $\Delta X<\Delta Y$), the circuitry of FIGS. 4A—C will temporarily store this advance signal until it can be paired with a corresponding major component advance signal. Major component advance signals are themselves never stored.

FIG. 4A shows a comparator 400 which may be of any of several well-known forms. Comparator 400 accepts as inputs the desired increment signals $\Delta X$ and $\Delta Y$ stored in registers 101 and 102 and available on leads 401 and 402 respectively. A signal is then provided on lead 403 whenever it is determined by comparator 400 that the X component of the desired line segment is greater than that of the Y component. Lead 404 has a signal appearing on it whenever the converse is true. These outputs are supplied to OR gates 410 and 420 respectively. Also provided are inverter circuits 430 and 440.

FIG. 4B includes AND gates 450, 451, and 452. Also shown is a standard flip-flop circuit 460 which provides an output signal on lead 461 whenever a signal is supplied on a set lead 462, even if this signal is then removed. Thus flip-flop 460 stores signals appearing on lead 462. Whenever a signal is applied on lead 463, thereby resetting flip-flop 460, the signal on 461 is removed. Gate 465 is provided to AND the output flip-flop 460 on lead 461 and the advance signal on lead 150 from BRM 100. Gate 466 is an OR gate. The output of gate 466 on lead 250 is used in accordance with the present invention to replace the signal from BRM 100 on lead 130 as an input to the image generating circuitry 120.

The circuit of FIG. 4C performs an equivalent operation for the Y component to that provided by FIG. 4B for the X component. Again gates 550, 551, 552 and 565 are AND gates and gate 566 is an OR gate. Flip-flop 560 may be identical to that shown in FIG. 4B as 460. When the output signals from BRM 100 are in suitable pulse form, the clock signal input leads in FIGS. 4B, C are not needed. In such cases, gates 452 and 552 are also not needed; the inputs on leads 130 and 150 are then used to reset the respective flip-flops directly.

The output signals on leads 250 and 260 are now available to increment the absolute X and Y position signals stored in registers shown in FIG. 1 by 122 and 123, respectively. Now, however, in accordance with one embodiment of the present invention, each increment in the minor component register (122, when $\Delta X \leq \Delta Y$) will be incremented only when the signals stored in the major component register (123, when $\Delta X \leq \Delta Y$) are also incremented.

Figure 5:
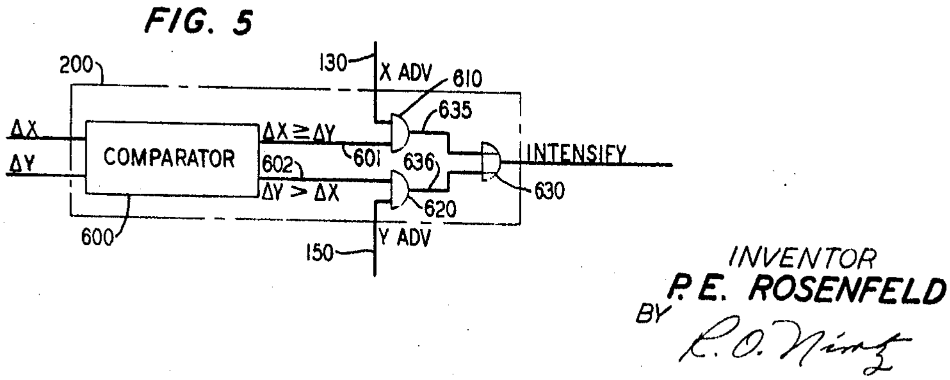
FIG. 5 shows a simplified configuration for the postprocessor of FIG. 3 in accordance with another embodiment of the present invention.

The circuit shown in FIG. 5 is an alternate embodiment of the present invention which uses to advantage the fact that a nonintensified point can be positioned more rapidly than an intensified point.

FIG. 5 shows a comparator 600 which may be of any well-known type, and in particular may be identical to that indicated in FIG. 4A by 400. Gates 610 and 620 are AND gates, and gate 630 is an OR gate.

Comparator 600 again compares the magnitude of ΔX and ΔY and provides an output on lead 601 whenever ΔX is greater than or equal to ΔY. Correspondingly, a signal is presented on lead 602 whenever ΔY is greater than ΔX. Thus, only one of the gates 610 or 620 will be activated by an advance signal on either or both of leads 130 or 150, i.e., the respective advance signals from the BRM. When an output is present on either of the leads 635 or 636, however, a signal will be supplied by gate 630 to activate intensification circuit 124 in FIG. 1.

Thus, the circuit of FIG. 5 allows the positioning of a beam in accordance with the existing BRM 100. However, only selected ones of the points so specified will be intensified. The points selected for intensification are in accordance with a variation of the algorithm given above, which variation provides that: No intensification shall occur for a point arrived at through a spatial increment in the direction of the minor component only. Thus, no point will be illuminated on the face of the CRT 121 unless it has been arrived at by simultaneous increments in both coordinate directions or by an increment in the major component direction alone.

It should be understood, of course, that, although convenient, it is not necessary that two signals specifying increments in the respective coordinate directions need not originate simultaneously. The circuitry of FIGS. 4B and C when used with that of FIG. 4A, provide for temporary storage of one increment signal while waiting for a corresponding other signal with which to be paired.

While the present disclosure has emphasized positioning on a two-dimensional CRT screen, the present invention will also find application in other and varied contexts. In particular, applications relating to the above-mentioned machine tools will occur to those skilled in the art. Those aspects relating to selective intensification will be understood to imply selective activation of a machine tool or the like, as appropriate. An obvious extension of the invention heretofore disclosed is that relating to a three-dimensional version of the positioning algorithm and its various embodiments.

When applied to a three-dimensional positioning situation, the algorithm need only be revised to the extent that comparisons be made between each of the three coordinate components and a gradation from smallest, through intermediate, to largest components be established. A spatial increment then occurs in the direction of the intermediate component only when it is paired with an increment in the largest component direction. An increment in the smallest component direction occurs only when similarly related to increments in both the intermediate and largest component directions.

Other typical applications of the present invention are those involving positioning of a laser beam in approximation to a linear trace or a target. Additionally, the phosphor-coated screen of cathode-ray tube 121 described above may be replaced by a photographic or other film for permanently recording the desired linear image.

While the above disclosure has proceeded on the basis of a rectangular coordinate system, no such restrictions inhere in the present invention. Suitable modifications to the technique described herein will occur to those skilled in the art when the use of other coordinate systems is dictated.

It should be understood that while specific hardware embodiments of the present invention have been given, the present invention may also be represented by the various algorithms or methods of carrying out the necessary functions. These methods may be practiced on any of various types of apparatus, and in particular may be carried out on a general or special purpose computer. The latter computer-based embodiments are especially attractive in those cases where a graphics facility is intimately involved in a computer system. Such a system is described, for example, in "Multi-Function Graphics for a Large Computer System" by C. Christensen and E. N. Pinson, *AIFPS* 1967, FSCC PROC., Thompson Books, Washington D.C., 1967, pp. 697—712. In a computer environment, the various decisional and storage functions involved in the various embodiments of the present invention described above will be recognized by those skilled in the art to be well-known standard computer operations.

In all cases, the above-described arrangements are illustrative of the many possible specific embodiments that can represent applications of the principles of the invention. Numerous and varied other arrangements can be devised in accordance with these principles by those skilled in the art without departing from the spirit and scope of the invention.

What I claim is:

1. The machine method of successively positioning a controlled element to constrain its movement to approximate a linear trajectory comprising the steps of:

A. determining in a machine the relative magnitude of coordinate components of said linear trajectory, thereby identifying superior and inferior components of said trajectory, B. advancing said controlled element under automatic machine control in a direction of an inferior component only when accompanied by an advance in the direction of all superior components.

2. The method of successively positioning a controlled element to constrain its movement to approximate a linear trajectory in a plane defined by orthogonal coordinates comprising the machine implemented steps of:

A. determining in a machine the major and minor vector components of said trajectory, B. machine generating sequences of advance signals corresponding to each of said components, the rate of occurrence of signals in each sequence being in proportion to the relative magnitude of its corresponding component, and C. selectively editing in a machine said sequence of signals corresponding to said inferior component by delaying those not identifiable with a corresponding signal in said sequence corresponding to said major component.

3. The method of claim 2 wherein said delaying is performed whenever signals in said sequence corresponding to said minor component do not occur at substantially the same point in time as a signal in said sequence corresponding to said major component.

4. Apparatus comprising:

A. means for storing selected ones of a first sequence of signals, and

B. means for reading said stored signals in response to ones of a second sequence of signals, C. means for positioning a controlled element in accordance with said first and second sequences of signals.

5. Apparatus according to claim 4 further comprising:

A. means for generating the signals of said first sequence at a rate corresponding to the magnitude of a first input signal, and B. means for generating the signals of said second sequence at a rate corresponding to the magnitude of a second input signal.

6. Apparatus according to claim 5 further comprising:

A. a comparator for generating signals indicative of the magnitudes of said first and second input signals, and B. means responsive to said signals generated by said comparator for selecting ones of said first sequence of signals.

7. In a system for illuminating selected portions of a surface with signals from a source of radiant energy, apparatus for generating an approximation to a linear illuminated trajectory comprising:

A. means for generating a first sequence of positioning signals corresponding to increments in the direction of a first coordinate direction, B. means for generating a second sequence of positioning signals corresponding to increments in the direction of a second coordinate direction, C. means for identifying individual ones of said signals in said first sequence with ones of said signals in said second sequence, and D. means for activating said source of radiant energy whenever individual ones of said signals in said first sequence are identified with corresponding ones of said signals in said second sequence.